(12) United States Patent
Belton et al.

(10) Patent No.: US 10,340,068 B2
(45) Date of Patent: Jul. 2, 2019

(54) CURRENT FEED-THROUGH

(71) Applicant: SIEMENS HEALTHCARE LIMITED, Camberley (GB)

(72) Inventors: Neil John Belton, Didcot (GB); Malcolm Faithfull, Newbury (GB); Michael Simpkins, Finstock (GB)

(73) Assignee: Siemens Healthcare Limited, Camberley (GB)

( * ) Notice: Subject to any disclaimer, the term of this patent is extended or adjusted under 35 U.S.C. 154(b) by 0 days.

(21) Appl. No.: 15/103,460

(22) PCT Filed: Nov. 11, 2014

(86) PCT No.: PCT/EP2014/074296
§ 371 (c)(1),
(2) Date: Jun. 10, 2016

(87) PCT Pub. No.: WO2015/086242
PCT Pub. Date: Jun. 18, 2015

(65) Prior Publication Data
US 2016/0314886 A1    Oct. 27, 2016

(30) Foreign Application Priority Data

Dec. 10, 2013 (GB) .................................. 1321770.8

(51) Int. Cl.
*H01F 6/06* (2006.01)
*H02G 15/34* (2006.01)
*H02G 3/22* (2006.01)

(52) U.S. Cl.
CPC .............. *H01F 6/065* (2013.01); *H02G 3/22* (2013.01); *H02G 15/34* (2013.01); *Y02E 40/648* (2013.01)

(58) Field of Classification Search
CPC .......... H01F 6/065; H02G 15/34; H02G 3/22; Y02E 40/648; H01B 17/305; H02K 55/04; H02K 5/12
See application file for complete search history.

(56) References Cited

U.S. PATENT DOCUMENTS 3,644,803 A * 2/1972 Levi ........................ H01F 6/065
                                                                257/716
3,904,815 A * 9/1975 Bamberger ........... F17C 13/006
                                                                174/15.3
4,251,680 A    2/1981 Germann
(Continued)

FOREIGN PATENT DOCUMENTS

GB    1 566 733 A    5/1980
JP    S5947781 A    3/1984
(Continued)

OTHER PUBLICATIONS

Translation of JP-H07312309-A, Nov. 28, 1195, Conon Kk, all.*
(Continued)

*Primary Examiner* — Bernard Rojas
(74) *Attorney, Agent, or Firm* — Schiff Hardin LLP

(57) ABSTRACT

A current feed-through has a mounting feature, a member accessible from both sides of the mounting feature and an electrical isolator, connecting the mounting feature and the member in respective positions, to ensure mechanical integrity and electrical isolation between the mounting feature and the member.

15 Claims, 9 Drawing Sheets

(56) References Cited

U.S. PATENT DOCUMENTS

| | | | | | |
|---|---|---|---|---|---|
| 5,401,406 | A | * | 3/1995 | Johnson | B01D 29/33 |
| | | | | | 210/323.2 |
| 6,342,672 | B1 | * | 1/2002 | Kaneko | H01F 6/065 |
| | | | | | 174/125.1 |
| 6,628,024 | B1 | * | 9/2003 | Mirmobin | H01B 17/303 |
| | | | | | 174/151 |

FOREIGN PATENT DOCUMENTS

| JP | S60170908 A | 9/1985 |
|---|---|---|
| JP | H04114412 A | 4/1992 |
| JP | H0785905 A | 3/1995 |
| JP | H07312309 A | 11/1995 |

OTHER PUBLICATIONS

Perin et al.; "Study of materials and adhesives for superconducting cable feedthroughs"; AIP Conference Proceedings; vol. 613; pp. 551-558; (2002).

* cited by examiner

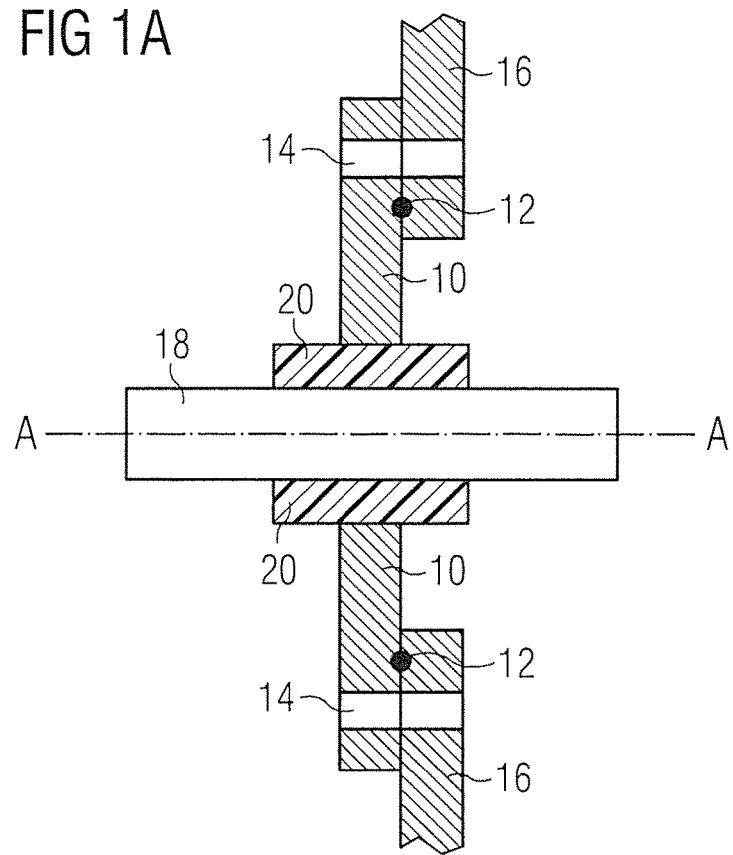
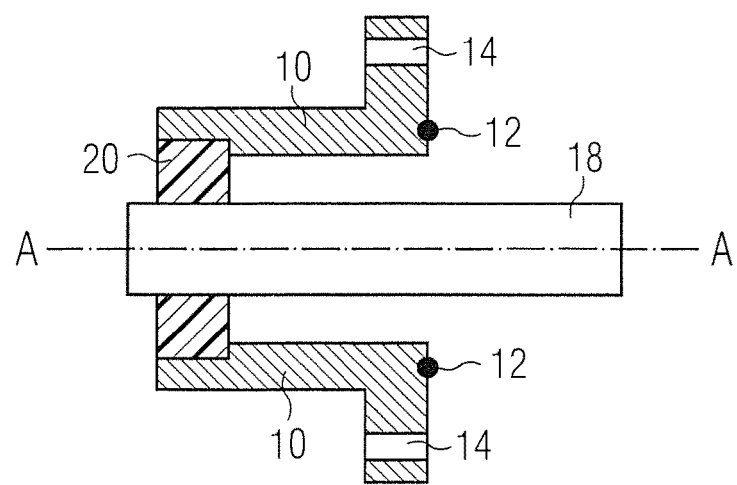

CURRENT FEED-THROUGH

BACKGROUND OF THE INVENTION

Field of the Invention

The present invention relates to current feed-throughs used to provide an electrically conductive path through the wall of a vessel, which path is electrically isolated from the vessel itself.

In particular, the present invention relates to such current feed-throughs which are suitable for providing current to, and removing current from, superconducting structures within a vacuum vessel or a cryogen vessel.

Description of the Prior Art

In the case of modern superconducting magnets for MRI systems, for example, it may be required to provide an electrical current path from a superconducting coil assembly which is contained in one cryogen vessel, and a superconducting switch which may be provided external to the cryogen vessel, or even enclosed within a second cryogen vessel.

While the MRI magnet provides an example of a possible field of use of the present invention, the present invention is not restricted to such field of use, and may be applied in numerous other situations.

Examples of current feed-throughs are described in:

MESSER GRIESHEIM GMBH MESG-S European Patent EP 0 510 397;

Section 6.5 of the MDC Vacuum Ltd catalogue (www-.mdcvacuum.co.uk); and

M. Kuchnir "Fabrication of Cryogenic Electrical Feedthroughs" FERMILAB TM-596 Aug. 8, 1975 at http://lss.fnal.gov/archive/tm/TM-0596.pdf.

It is preferred that such feed-throughs should have the minimum possible electrical resistance at the temperature of operation of the superconducting magnet and the superconducting switch. The feed-throughs must be capable of supporting a vacuum on one side, and cryogen pressure on the other.

SUMMARY OF THE INVENTION

In accordance with the invention, a current feed-through has a mounting feature, a member accessible from both sides of the mounting feature and an electrical isolator, connecting the mounting feature and the member in respective positions, to ensure mechanical integrity and electrical isolation between the mounting feature and the member.

BRIEF DESCRIPTION OF THE DRAWINGS

FIGS. 1A-1E show examples of current feed-throughs which may be improved by the present invention.

DESCRIPTION OF THE PREFERRED EMBODIMENTS

According to the present invention, a superconducting current feed-through is provided, whereby a continuous superconducting circuit may be established between superconducting magnet coils located within a cryogen vessel and a superconducting switch located external to that cryogen vessel: possibly within another cryogen vessel.

To enable such a circuit, the present invention provides a current feed-through which is capable of sealing against the wall of a cryogen vessel in a cryogen-tight manner and which is superconducting at its temperature of operation.

It is desirable that a continuous superconducting path joins the superconducting switch to the superconducting magnet coils. This may require at least two superconducting feed-throughs to pass through a hermetic barrier which is both cryogen-tight and electrically isolates the superconducting current path from the barrier.

Figure 1C:
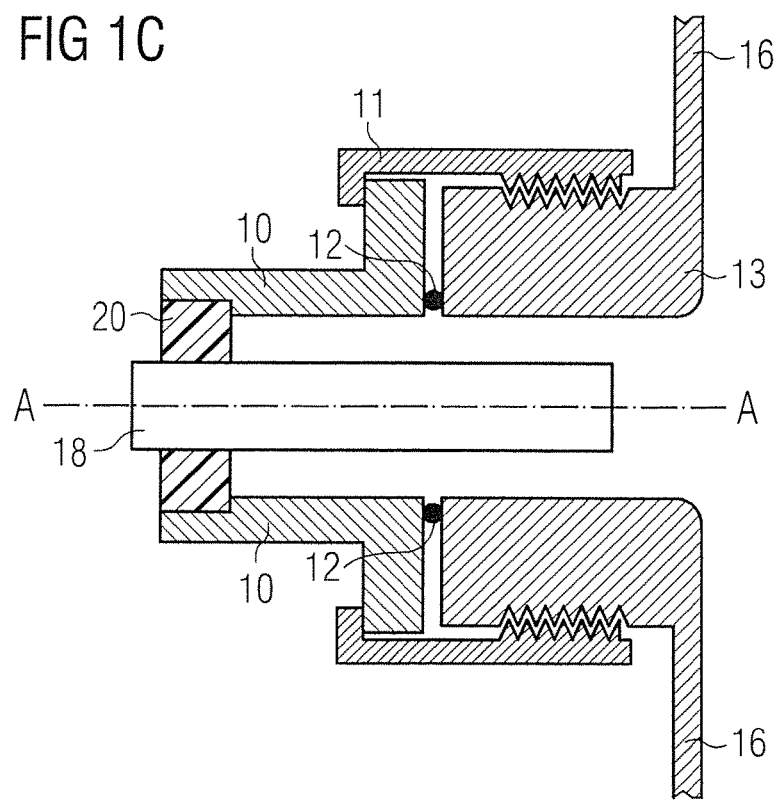

Examples of current feed-throughs, not according to the present invention, are shown in FIGS. 1A-1E. In each case, the structure is rotationally symmetrical about axis A-A. A mounting flange 10 is provided. It carries a seal 12 and mounting features such as through-holes 14 that enable it to be mounted to hermetic barrier 16, which may be a wall of a cryogen vessel. The seal may be of a polymer, of indium, of copper or any suitable material. An electrically conductive member 18 provides a current path which is accessible from both sides of the mounting flange 10, and both sides of the hermetic barrier 16 once installed. An electrical isolator 20 retains the flange and the electrically conductive member in their respective positions, provides hermetic sealing between them and ensures electrical isolation between the flange and the electrically conductive member. In some embodiments, the electrical isolator 20 may be provided in the form of a coating on the electrically conductive member 18. Such coating may be a ceramic coating, or a polymer coating, or anodising, by way of examples. The electrical isolator may be of a ceramic or another mechanically robust, electrically insulating material. In some arrangements, the flange 10 may be of an electrically isolating material. In some such arrangements, the electrical isolator 20 and the flange 10 may be combined into a single piece. In other arrangements, the flange 10 and the electrical isolator 20 may be distinct components, as illustrated in the drawings. In arrangements such as shown in FIGS. 1A, 1B, the electrical isolator 20 may be bonded directly to the electrically conductive member 18, for example by solder, resin, brazing. FIG. 1C illustrates an alternative structure where the mounting features include a threaded collar 11 which may be threaded onto a threaded interface 13 provided in hermetic barrier 16. Tightening the threaded collar 11 compresses seal 12 between the mounting flange 10 and the threaded interface 13. Other mounting features may be employed, as will be appreciated by those skilled in the art.

Figure 1D:
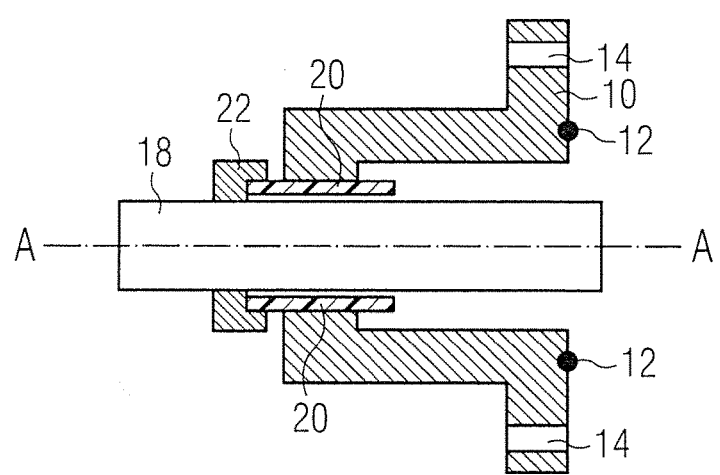
Figure 1E:
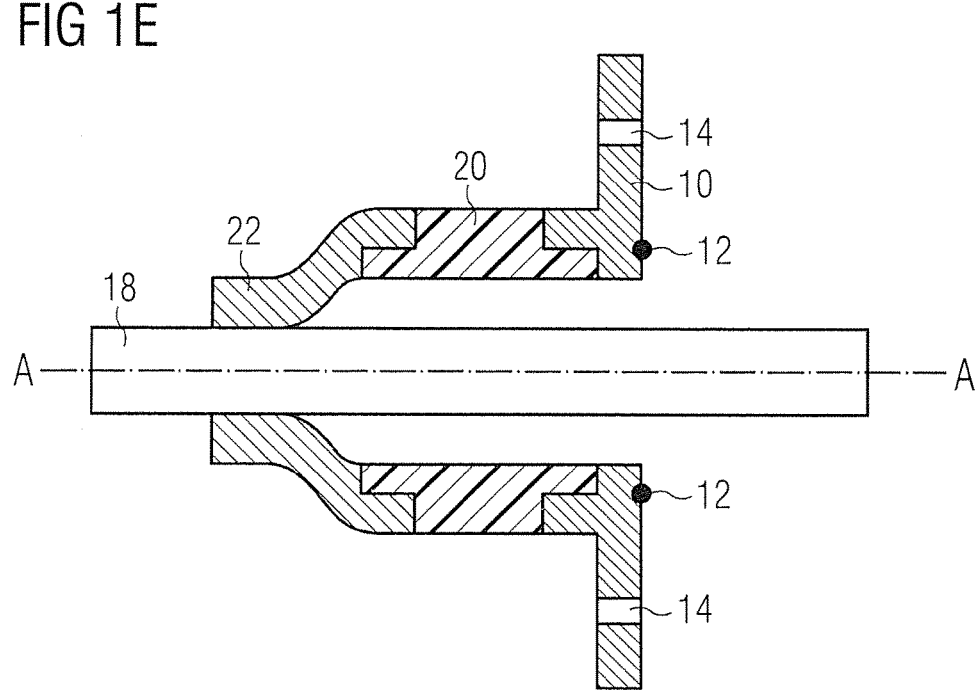

Alternatively, as in structures such as shown in FIGS. 1D, 1E, a cap piece 22, preferably of metal, may be provided to link the electrical isolator 20 to the electrically conductive member 18. The cap piece 22 must be hermetically sealed to both the electrically conductive member 18 and the electrical isolator 20. This may be achieved for example by solder, resin, brazing.

At least some of the structures described above resemble some of the structures described in the prior art mentioned above.

The above-described structures include an electrically-conductive member 18, typically of copper or aluminium. However, as discussed above, the present invention seeks to enable current feed-throughs which allow the assembly of a complete superconducting circuit path which traverses a hermetic barrier 16, such as a wall of a cryogen vessel. The present invention provides a current feed-through with a superconducting current path suitable for including in a superconducting circuit comprising a complete superconducting current path which traverses a hermetic barrier 16, such as a wall of a cryogen vessel.

Superconducting wire is typically in the form of a carrier material, such as copper or aluminium, which contains thin strands of superconducting material. Such wire typically has an approximately rectangular cross-section, although other cross-sections, such as circular, are available.

This is achieved by the modification of a feed-through such as described above by embedding a length of superconducting wire within an electrically conductive member such as described above, either before or after the electrically conductive member is assembled into the current feed-through.

In certain embodiments, the current feed-through may be installed on the hermetic barrier 16, the superconducting circuit assembled and a superconducting wire passed through a hole in the electrically conducting member to be sealed in place in-situ. In other embodiments, the feed-through is assembled with a length of superconducting wire embedded in the electrically conductive member, but protruding from each end thereof, such that superconducting joints of any structure known to those skilled in the art may be provided to complete a superconducting circuit. In yet further embodiments, the feed-through is assembled with a length of superconducting wire embedded in the electrically conducting member, not protruding from each end thereof, such that joints of any structure known to those skilled in the art may be provided to complete a circuit, possibly including a short length of current path which passes through the material of the electrically conductive member, not being superconductive but being of very low resistance.

In the following description, embodiments of the invention are described by reference only to amendments made to the electrically conductive member 18 of feed-throughs such as illustrated in FIGS. 1A-1E. The conductive member amended according to the present invention may be incorporated into a number of differing feed-throughs, similar to those described above and illustrated in FIGS. 1A-1E.

FIGS. 2A-2F show axial cross-sections through conductive members 18 according to examples of the present invention. FIGS. 3A-3F show corresponding axial views in direction X.

Figure 2A:
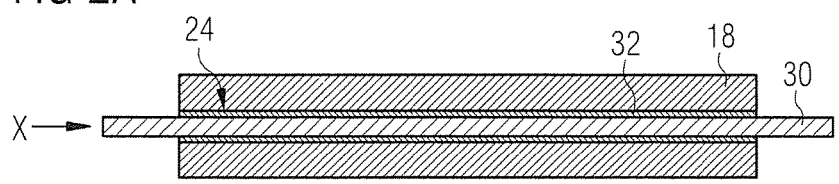
FIGS. 2A-2F show modified electrically conductive members according to respective embodiments of the present invention, in axial cross-section.
Figure 3A:
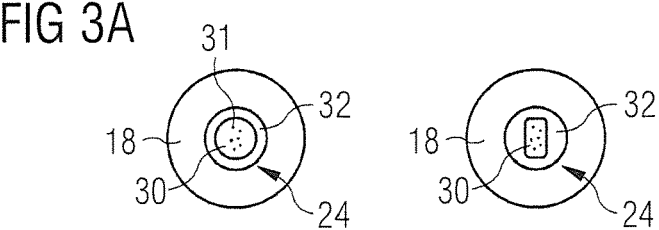
FIGS. 3A-3F show end views of modified electrically conductive members corresponding to the arrangements shown in respective FIGS. 2A-2F.

FIG. 2A illustrates a basic example of an electrically conductive member 18, modified to have a central bore 24. Superconducting wire 30 is passed through the bore. The superconducting wire 30 is sealed to the bore by a solder 32 or other suitable sealing material. FIG. 3A shows example views of certain embodiments, taken in the direction X, showing electrically conductive member 18, superconducting wire 30 and solder 32 in cross-section. As is well known to those skilled in the art, the superconducting wire typically comprises superconducting filaments 31 embedded within a resistive sheath material such as copper or aluminium.

In the examples illustrated in FIG. 3A, bore 24 is of circular cross-section, while the superconducting wire 30 may be of circular or rectangular cross-section, sealed into the bore with solder or other sealing material 32.

Figure 2B:
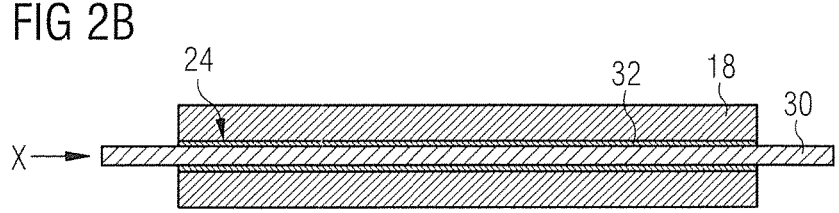
Figure 3B:
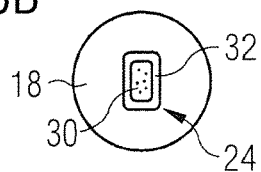

FIGS. 2B and 3B show corresponding views of another example. In this example, the bore 24 has an approximately rectangular cross-section: in fact, the shape of a rectangle with rounded corners. This closely matches the cross-section of the superconducting wire 30, meaning that superconducting wire of rectangular cross-section may be accommodated with a solder layer of consistent thickness. Superconductor wire of other cross-sectional shape may similarly be accommodated within correspondingly-shaped bores 24.

Figure 2C:
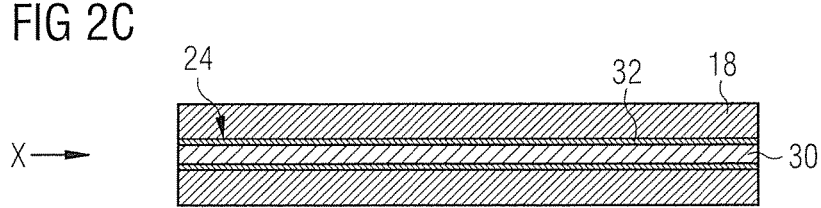
Figure 3C:
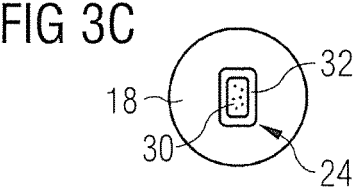
Figure 3D:
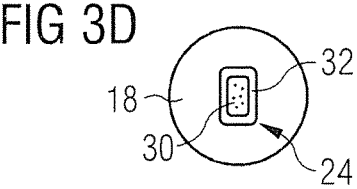

FIGS. 2C and 3C illustrate an example similar to that shown in FIGS. 2B and 3B, but in which the superconducting wire 30 does not protrude beyond the ends of the electrically conductive member 18. The view in direction X, shown in FIG. 3C, corresponds to the view in FIG. 3B.

Figure 2D:
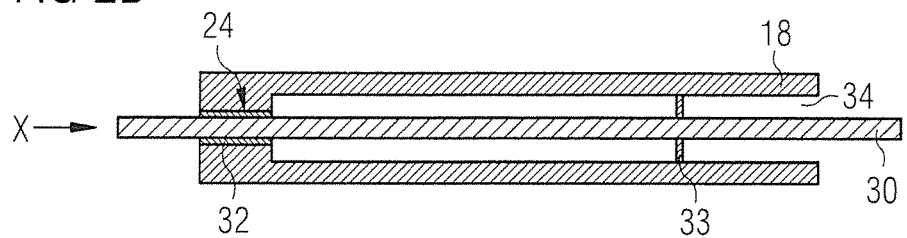

FIG. 2D shows an example wherein the electrically conductive member 18 is hollow over a portion of its length, having an internal cavity 34 through which superconducting wire 30 may pass unsupported, as illustrated, or a filler material such as solder or a thermosetting resin may be provided to retain the superconducting wire in position. A shortened bore 24 extends through an otherwise-closed portion of the electrically conductive member, in a manner similar to that discussed with reference to FIGS. 2A-2C. A view in the direction X is again shown, in FIG. 3D. The hollowed section can be positioned on a cryogen side of the feed-through, so that the internal surface of the cavity 34 is in contact with the cryogen, which may be in gaseous or liquid form, and so is very well cooled. The limited length of the bore 24 reduces the amount of solder or other sealing material required. The shorter bore also leads to a more consistent formation of a seal between the electrically conductive member 18 and wire 30, with better wetting and fewer voids. This is partly because the bore 24 is shorter, and so only a shorter seal needs to be formed; and partly because the reduced mass of the electrically conductive member 18 means that it is easier to heat to a temperature required for effective soldering. Only that part if the electrically conductive member 18 containing the bore 24 need be heated, unlike embodiments described above where the whole length of the electrically conductive member 18 would need to be heated for effective soldering.

A retainer 33 may be provided within the cavity 34, to retain the superconducting wire 30 relatively immobile with respect to the conductive member 18. The material of the retainer is relatively unimportant, but should be stable at cryogenic temperatures. Copper, PTFE or other polymers may be suitable. FIG. 2G shows an axial view of an example spacer 33, having a central hole 33a to accommodate the superconducting wire, with passages 33b to allow cryogen to pass by, into and out of the cavity 34.

Figure 2E:
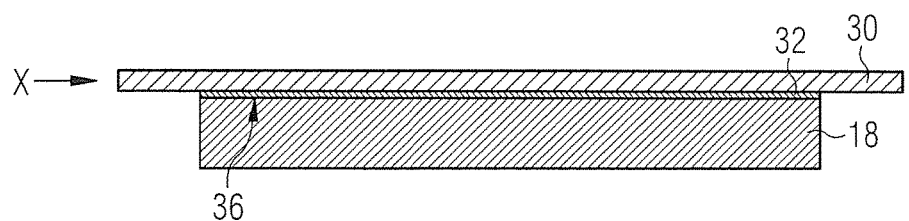
Figure 3E:
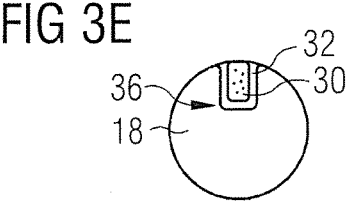

FIGS. 2E, 3E show an alternative arrangement, in which a groove 36 is formed in a periphery of the electrically conductive member 18, the superconducting wire 30 is placed into the groove and a sealing material 32 such as solder or a resin is provided to retain the superconducting wire in place.

Figure 2F:
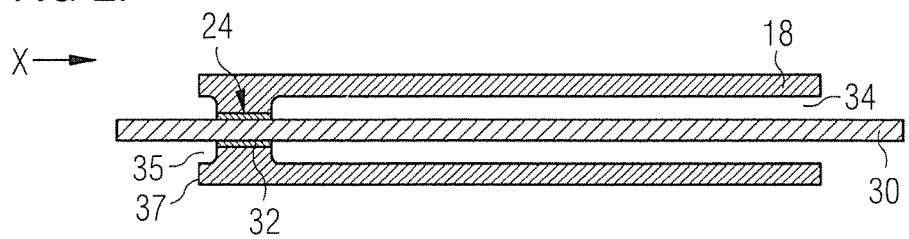
Figure 2G:
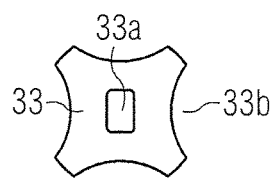
FIG. 2G shows an axial view of a spacer optionally used in embodiments such as shown in FIGS. 2D, 2F.
Figure 3F:
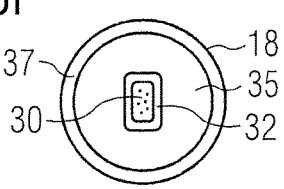

FIGS. 2F and 3F show an improved variant of the arrangement of FIG. 2D, in which one end of the electrically conductive member 18 is provided with a detent 35 surrounded by a bund or lip 37. The detent 35 is of use in assembling the superconducting wire 30 into the electrically conducting member 18. The electrically conducting member is arranged with the detent 35 vertically uppermost. The superconducting wire 30 is then passed through the bore 24. A predetermined quantity of solder is placed in the detent and the structure heated. The superconducting wire 30 is preferably a close fit within the bore 24, with a predetermined clearance between the wall of the bore and the surface of the superconducting wire. The cross-section of the bore 24 should be selected to match the cross-section of the superconducting wire 24. Once heated, molten solder wicks between the superconducting wire 30 and the wall of the bore 24. The predetermined quantity of solder may be a measured mass, or a measured length of a known gauge of solder wire. By controlling the mass of solder employed, one may ensure that enough solder is provided to seal between the superconducting wire 30 and the electrically conductive member 18, but not so much that excess solder presents a difficulty. Consistent sealing may be achieved, since it is clear whether an appropriate quantity of solder has wicked into the clearance.

Figure 4:
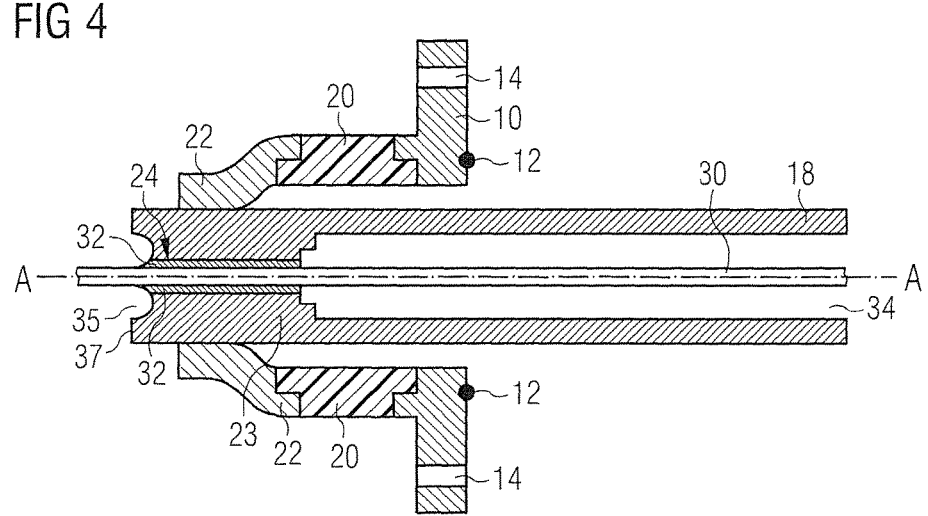
FIG. 4 shows an axial cross-sectional view of a current feed-through of an embodiment of the present invention.

FIG. 4 shows an axial cross-section view of a current feed-through of an embodiment of the present invention, incorporating an electrically conductive member 18 similar to that discussed with reference to FIG. 2F, shown in cross-section. Step feature 23 within bore 34 reduces the tendency of solder or resin to wick along the superconducting wire 30 beyond the bore 24, and assists in providing a reliable seal by ensuring that a known quantity of solder or other sealant is provided within bore 24. Flange 10 may be arranged for clamping with a seal 12 such as a polymer, indium or copper.

Figure 5:
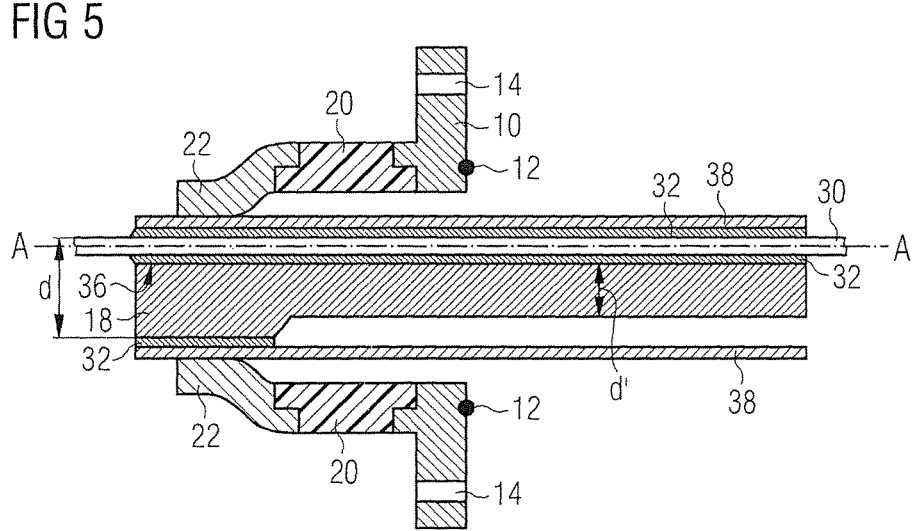
FIG. 5 shows an axial cross-sectional of a current feed-through of another embodiment of the present invention.

FIG. 5 shows an axial cross-sectional view of a feed-through of an embodiment of the present invention, incorporating an electrically conductive member 18 similar to that discussed with reference to FIG. 2F. In this arrangement, the electrically conductive member 18, which includes a groove 36 accommodating superconducting wire 30, is placed within a tube 38. This tube 38 may be electrically conductive, for example of copper or aluminium. It may be sealed to cap piece 22 or electrical isolator 20, and further sealed to the electrically conductive member 18 by a layer of solder, resin or another sealing material 32. It may be regarded as a part of the electrically conducting member 18. Alternatively, the tube 38 may be of ceramic or another electrically isolating material, in which case the tube 38 may take the place of electrical isolator 20.

Figure 6:
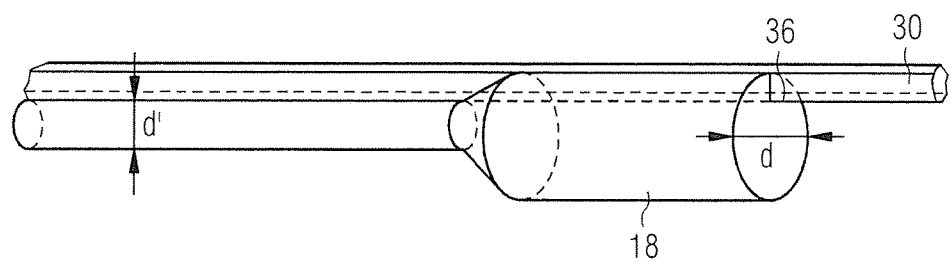
FIG. 6 shows an early step in the assembly of a current feed-though such as shown in FIG. 5.

FIG. 6 shows an early step in the assembly of a current feed-though such as shown in FIG. 5. In this embodiment, as in FIG. 5, the electrically conductive member 18 has a reduced diameter d' over a portion of its length, and a larger diameter d over another portion of its length. In this example, groove 36 is formed only in the larger-diameter part, with superconducting wire 30 resting on a periphery of the electrically conducting member along the smaller-diameter part. The electrically conducting member 18 and the superconducting wire 30 may be assembled together by soldering or addition of a resin in a current feed through as described above.

Tube 38 may be sealed to cap piece 22 or electrical isolator 20. The sub-assembly shown in FIG. 6 may be slid inside the tube 38 and sealed to it by a suitable method such as soldering, resin bonding or brazing. In other embodiments, a member 18 such as shown in FIGS. 1A-4 may be placed inside tube 38 and sealed to the tube 38 in an appropriate manner, such as by soldering, resin bonding or brazing.

In particularly preferred embodiments, the present invention provides current feed-throughs with a solid electrically conductive member in which a groove 36 or bore 24 is cut to correspond to a cross-section of a superconducting wire which is placed in the groove or bore with a predetermined clearance for effective wicking of solder or other sealing material.

The sealing material 32 must be chosen with care, so that the superconducting wire is not damaged by excessive temperatures; so that the material provides a robust seal at ambient temperature while remaining ductile at cryogenic temperatures yet not suffering from long-term creep.

Suitable materials include solder with a high lead (Pb) content which remains ductile at low temperatures.

Figure 7:
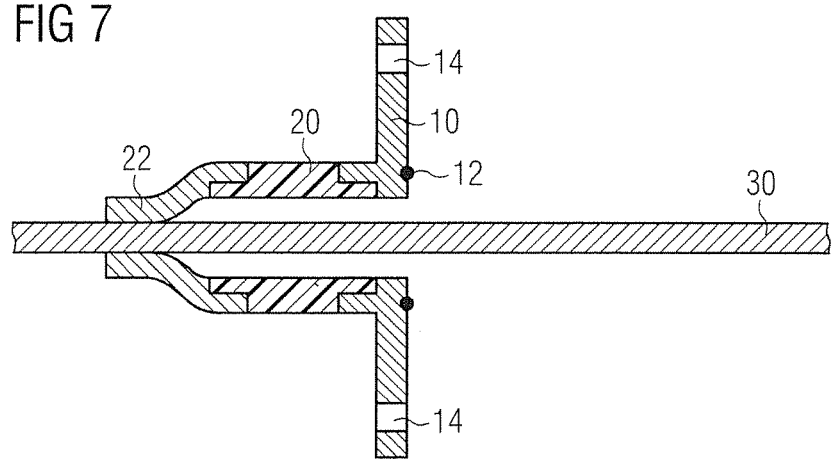
FIG. 7 shows an axial cross-section of an example of another variant of the present invention.
Figure 8:
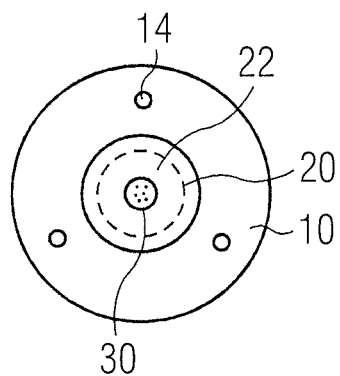
FIG. 8 shows an axial end-view of the embodiment of FIG. 7.

In another embodiment, as shown in axial cross-section in FIG. 7, and in an axial end-view in FIG. 8, the current lead-through may be scaled down such that the member 18 is no longer required, and the superconducting wire 30 itself may be sealed into the feed-through to cap piece 22.

Figure 9:
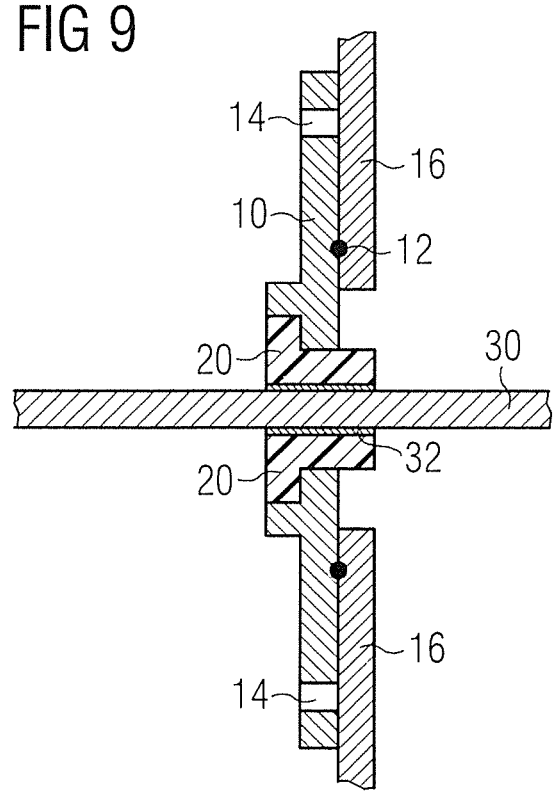
FIG. 9 shows an axial cross-section of a yet further variant of the present invention.

FIG. 9 shows an example where no cap piece 22 is used, and the superconducting wire is sealed direct to the electrical isolator 20 by a solder or other sealing material 32.

Embodiments such as illustrated in FIGS. 7-9 may be found simpler to manufacture if a superconducting wire 30 is used which has a circular cross section, although superconducting wires with rectangular and other cross sections may be used, providing that appropriate care is taken with sealing the wire onto the electrical isolator 20 or cap piece 22.

Preferably, the electrical isolator 20 or cap piece 22 is provided with a hole of dimensions to provide a predetermined clearance to the superconducting wire, to enable effective sealing by solder, resin, brazing or the like. Electrical isolator 20 may in fact be provided as a coating on electrically conductive member 18, and the feed through completed by sealing the electrical isolator to the flange 20 or even direct to hermetic barrier 16. The coating may be of ceramic, or polymer, for example, but must be electrically isolating and stable at cryogenic temperatures.

In all cases, the superconducting wire 30 may for example have a length of 5-10 meters, allowing plenty of wire for jointing to other parts of the superconducting circuit.

While the above embodiments have been discussed with reference to an electrically conductive member, in alternative embodiments, this electrically conductive member 18 may be replaced by a non-conductive member such as a ceramic. The superconducting wire 30 may be sealed to the ceramic member by soldering, brazing or by a resin, for example. The use of an electrically conductive member 18 soldered to the superconducting wire has the advantage of providing a very low resistance current path in case the superconducting wire in the feed-through quenches. However, where such a current path is not required, use of the ceramic member may provide a lightweight, inexpensive alternative.

In yet further embodiments, an electrically conductive member may be used, but electrically isolated from the superconducting wire. This may be achieved with an anodised aluminium member, or a copper member coated with a ceramic or oxide.

Although modifications and changes may be suggested by those skilled in the art, it is the intention of the inventors to embody within the patent warranted hereon all changes and modifications as reasonably and properly come within the scope of their contribution to the art.

We claim as our invention:

1. A current feed-through for a continuous superconducting circuit having a circuit component inside a cryogen vessel and a circuit component outside of said cryogen vessel, said current feed-through comprising:
   a mounting fixture having an attachment structure designed to attach the mounting fixture to a wall of the cryogen vessel in order to place an exterior side of said mounting fixture in a vacuum environment and an interior side of said mounting fixture in a cryogenic environment;
   a member proceeding through said mounting fixture and being accessible from both of said sides of the mounting fixture;
   an electrical isolator, connecting the mounting fixture and the member in respective positions, to ensure mechanical integrity and electrical isolation between the mounting fixture and the member; and
   said member having a bore therein, and a single, continuous superconducting wire proceeding through said bore so as to be accessible from both sides of the mounting fixture in order to electrically connect the respective components of said continuous superconducting circuit inside and outside of said cryogen vessel, the superconducting wire being bonded and sealed to the bore and thereby maintained in a superconducting state in said mounting fixture by said cryogenic environment.

2. A current feed-through according to claim 1, wherein the bore has a cross-section that closely matches a cross-section of the superconducting wire with a predetermined clearance.

3. A current feed-through according to claim 2, wherein the bore has an approximately rectangular cross-section.

4. A current feed-through according to claim 1, wherein the member is electrically conductive.

5. A current feed-through according to claim 4, wherein the electrically conductive member has an electrically isolating layer between the member and the superconducting wire.

6. A current feed-through according to claim 1, wherein the member is formed of a ceramic.

7. A current feed-through according to claim 1, wherein the superconducting wire is soldered or brazed to the member to provide a seal.

8. A current feed-through according to claim 1, wherein the superconducting wire is bonded and sealed to the member by a resin.

9. A current feed-through according to claim 1, wherein the mounting fixture and the electrical isolator are formed by a single piece of an electrically isolating material.

10. A current feed-through according to claim 1, further comprising a cap piece linking the electrical isolator to the member, said cap piece being sealed to both the member and the electrical isolator.

11. A current feed-through according to claim 1, wherein the electrical isolator is bonded directly to the member.

12. A current feed-through according to claim 1, wherein the member is hollow over a portion of its length, and has an internal cavity forming the bore through which the superconducting wire passes.

13. A current feed-through according to claim 12, comprising a retainer within the cavity, that holds the superconductive wire relatively immobile with respect to the member.

14. A current feed-through according to claim 13, comprising a filler material that retains the superconducting wire in position within the cavity.

15. A current feed-through according to claim 1, wherein one end of the member has a detent surrounded by a lip.

* * * * *